Patented Jan. 27, 1925.

1,524,494

UNITED STATES PATENT OFFICE.

ALBIN H. WARTH, OF BALTIMORE, MARYLAND, ASSIGNOR TO THE CROWN CORK AND SEAL COMPANY OF BALTIMORE CITY, OF BALTIMORE, MARYLAND, A CORPORATION OF MARYLAND.

PROCESS OF TREATING COMPOSITION CORK.

No Drawing. Application filed March 18, 1921. Serial No. 453,529.

*To all whom it may concern:*

Be it known that I, ALBIN H. WARTH, a citizen of the United States, residing at Baltimore, and State of Maryland, have invented certain new and useful Improvements in Processes of Treating Composition Cork, fully described and represented in the following specification.

This invention relates to a novel process of treating composition cork to destroy or prevent the development of mold spores, bacteria, fungus growths, yeasts, insect larvæ, etc.

As is well known, composition cork is made by comminuting cork and then mixing the comminuted cork with a binder which causes the particles to adhere in a mass. This mass, after proper treatment, is cut up into cork disks and may be fashioned into plugs or other articles. It has been found that the composition cork disks are particularly liable to become infected, during the process, with mold spores, bacteria, and other living organisms. Because of its cellular or honeycomb structure, the comminuted particles contain air which is necessary for the growth and development of living organisms, such as mold spores, and the development of mold spores particularly may be promoted by the presence of particles of bark which the comminuted cork may contain. The development of mold spores on cork disks has been the cause of considerable loss in connection with the manufacture and shipment of the well-known crown cork. As is well known, these crown corks consist of a metal cap, usually of tinned plate, each of which contains a cork disk, and such crown corks are shipped by the thousands of gross all over the world. If the disks or materials from which they are made contain living organisms, particularly mold spores, these organisms develop rapidly under certain climatic conditions and render the crown corks useless.

It has been proposed to mold proof cork disks by placing them in a centrifuge in a closed chamber and supplying the vapor obtained from vaporizing formaldehyde to the chamber. Formaldehyde vapor contains considerable moisture and does not readily diffuse into the cellular structure of the cork. The expedient of spinning the cork disks in the chamber containing this vapor is accordingly resorted to on the theory that the movement of the disks through the vapor will force it into the cellular structure of the cork. Further, formaldehyde does not readily vaporize at ordinary temperatures. In carrying out the process referred to, high temperatures are accordingly resorted to, the temperature in the vapor chamber being from 80° to 100° C. This high temperature is further said to have the advantage of expanding the cork cells so that the vapor can more readily enter them. In any event, if this high temperature be not maintained during the treatment with the formaldehyde vapor, the formaldehyde will liquefy and the operation be ineffective. This process is expensive, not only on account of the cost of the material and expense of maintaining the high temperature, but because of the complicated apparatus which is necessary for carrying it out. This process has not, therefore, gone into use.

According to the present process, a toxic gas which is a true gas and which is not destructive of the cork structure, is used. Sulphur dioxid has been found to be exceedingly efficient, though other gases may be employed, as, for instance, hydrocyanic acid gas, carbonic acid gas, chlorine, etc. Sulphur dioxid, however, is cheap, is highly diffusive, and can be used at ordinary temperatures, that is, ordinary room temperatures. It will be noted that the gases referred to have the distinguishing property that they will, when combined with moisture, give a positive acid reaction at the moment of combination.

In carrying out the process, the cork to be treated is placed in a stationary container large enough to hold a sufficient amount of material to make the process economical in operation. While the size of the container is not material to the process, satisfactory results have been obtained by using a plurality of containers, each holding in the neighborhood of 2500 gross of cork disks. The toxic gas may be contained in cylinders which can be connected by suitable piping to the containers which should be closed during the treating operation.

The gas is allowed to flow into the stationary container for a length of time sufficient to effect the thorough diffusion of the gas through the cork. This diffusion of the gas through the cellular structure of the cork displaces the air in whole or in part so that at the end of the operation the cellular structure of the cork is filled with toxic gas instead of air. If the gas does not destroy any living organisms which the cork contains, the development of such organisms will be prevented, because the air necessary thereto has been displaced by the gas.

In ordinary practice, the material, after treatment, will be processed, that is, it will be coated with a wax which occludes the cells or pores on the outer surface of the cork and acts to seal the cork so that the toxic gas employed will not escape from the cork. This processing may be carried on in the ordinary way, it being common in the manufacture of cork disks to process them as a final step.

Care should be taken not to over-treat the material, as the saturation of the material with gas may be carried to such a point that the composition disks when placed in their metal shells and subsequently brought in contact with the liquid, will blacken. In carrying out the process in the most efficient manner, the gas will be admitted at a measured rate of flow and for a definite period, the rate of flow being determined by a proper gas flow gauge. Under proper conditions of operation a sufficient saturation of the disks to effect the purposes in view, may take place in from four to eight hours, the gas being admitted under a proper pressure.

The process may be carried out in such a way that at the end of the period of treatment no residual gas will remain in the container, but this result can only be obtained by a very careful calculation and manipulation of the gas flow. Under ordinary conditions of operation, it is considered preferable to permit somewhat more gas than is necessary for the treatment, to flow into the container and then exhaust the residual gas from the container. Where the process is carried out in this way, that is, by exhausting the residual gas, care should be taken to make the exhaustion thorough, so that workmen employed in carrying out the process will not be subjected to the deleterious effects of the gas.

Composition cork disks which have been treated as above described are tasteless and odorless, and, if the treatment is properly carried out, will not blacken when in contact with moist metals, such as the tinned plate caps in which the disks are contained. Such disks may be used in connection with a beverage or food product without any danger of contamination and they may be stored under any climatic conditions without suffering deterioration due to the development of living organisms. Further, the apparatus necessary for the commercial carrying out of the process is simple and inexpensive.

What is claimed is:

1. The process of treating composition cork to destroy living organisms therein which consists in supplying to a container in which the cork has been placed a gas which is toxic to the living organisms; which will not injure the cork; and which, when combined with moisture, will give a positive acid reaction at the moment of combination, until the gas has been thoroughly diffused through the cork and has, in whole or in part, displaced the air therein.

2. The process of treating composition cork to destroy living organisms therein which consists in supplying to a container in which the cork has been placed, at ordinary temperatures, a gas which is toxic to the living organisms, which will not injure the cork; and which, when combined with moisture, will give a positive acid reaction at the moment of combination, until the gas has been thoroughly diffused through the cork and has, in whole or in part, displaced the air therein.

3. The process of treating composition cork to destroy living organisms therein which consists in supplying to a stationary container in which the cork has been placed, at ordinary temperatures, a gas which is toxic to the living organisms; which will not injure the cork; and which, when combined with moisture, will give a positive acid reaction at the moment of combination, until the gas has been thoroughly diffused through the cork and has, in whole or in part, displaced the air therein.

4. The process of treating composition cork disks which consists in supplying to a container in which the disks have been placed a gas which is toxic to the living organisms; which will not injure the cork; and which, when combined with moisture, will give a positive acid reaction at the moment of combination, at a measured rate for a definite period of time until the gas has been thoroughly diffused through the cork and has, in whole or in part, displaced the air therein, the gas treatment being so controlled as to prevent the material from absorbing so much gas that the disks will blacken when brought in contact with moist metal.

5. The process of treating composition cork disks which consists in supplying to a container in which the disks have been placed a gas which is toxic to the living organisms; which will not injure the cork; and which, when combined with moisture, will give a positive acid reaction at the moment of combination, at a measured rate for a definite period of time until the gas has been thoroughly diffused through the cork and has, in whole or in part, displaced the air therein, the gas treatment being so controlled as to prevent the material from absorbing so much gas that the disks will blacken when brought in contact with moist metal, and then exhausting any residual gas from the container.

6. The process of treating composition cork disks which consists in supplying to a container in which the disks have been placed a gas which is toxic to the living organisms; which will not injure the cork; and which, when combined with moisture, will give a positive acid reaction at the moment of combination, at a measured rate for a definite period of time until the gas has been thoroughly diffused through the cork and has, in whole or in part, displaced the air therein, the gas treatment being so controlled as to prevent the material from absorbing so much gas that the disks will blacken when brought in contact with moist metal, then exhausting any residual gas from the container, and subsequently coating the disks with a processing material.

7. The process of treating composition cork to destroy living organisms therein which comprises subjecting the cork to the action of a gas which, when combined with moisture, will give a positive acid reaction at the moment of combination.

In testimony whereof, I have hereunto set my hand.

ALBIN H. WARTH.